United States Patent
Chen et al.

(10) Patent No.: US 10,491,625 B2
(45) Date of Patent: Nov. 26, 2019

(54) RETRIEVING NETWORK PACKETS CORRESPONDING TO DETECTED ABNORMAL APPLICATION ACTIVITY

(71) Applicant: International Business Machines Corporation, Armonk, NY (US)

(72) Inventors: Kuo-Chun Chen, New Taipei (TW); Chih-Hung Chou, Taipei (TW); Wei-Hsiang Hsiung, Taipei (TW); Sheng-Tung Hsu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 15/723,257

(22) Filed: Oct. 3, 2017

(65) Prior Publication Data

US 2019/0104146 A1   Apr. 4, 2019

(51) Int. Cl.
*H04L 29/06* (2006.01)
*G06F 21/57* (2013.01)
*G06F 21/55* (2013.01)

(52) U.S. Cl.
CPC .......... *H04L 63/1441* (2013.01); *G06F 21/55* (2013.01); *G06F 21/577* (2013.01); *G06F 2221/034* (2013.01)

(58) Field of Classification Search
CPC .................................................. H04L 63/1441
USPC ............................................................ 726/23
See application file for complete search history.

(56) References Cited

U.S. PATENT DOCUMENTS

| | | | |
|---|---|---|---|
| 7,907,608 B2 | 3/2011 | Liu et al. | |
| 8,891,528 B2 | 11/2014 | Moriarty et al. | |
| 9,621,441 B2 | 4/2017 | Williams et al. | |
| 9,667,723 B2 * | 5/2017 | Pandya | H04L 29/06 |
| 2015/0071085 A1 | 3/2015 | Tsimsky-Feigin | |
| 2016/0088002 A1 | 3/2016 | Yadav | |
| 2016/0191560 A1 * | 6/2016 | Pegna | G06F 21/552 726/23 |
| 2019/0104148 A1 | 4/2019 | Chen et al. | |

OTHER PUBLICATIONS

Goel et al., "Reconstructing System State for Intrusion Analysis", ACM SIGOPS Operating Systems Review Newsletter, vol. 42, Issue 3, Apr. 2008, pp. 21-28.
Shosha et al., "A Novel Methodology for Malware Intrusion Attack Path Reconstruction", International Conference on Digital Forensics and Cyber Crime, Oct. 2011, pp. 131-140.
Office Action, dated May 17, 2019, regarding U.S. Appl. No. 15/811,888, 13 pages.

* cited by examiner

*Primary Examiner* — Longbit Chai
(74) *Attorney, Agent, or Firm* — Yee & Associates, P.C.

(57) ABSTRACT

A system and computer program product for preventing abnormal application activity is provided. Packets are retrieved from a packet buffer using packet location information corresponding to information associated with the abnormal application activity in a data processing system. The packets are analyzed to identify content of the network packets causing the abnormal application activity. Network packets containing the content causing the abnormal application activity in the data processing system are blocked.

20 Claims, 4 Drawing Sheets

RETRIEVING NETWORK PACKETS CORRESPONDING TO DETECTED ABNORMAL APPLICATION ACTIVITY

BACKGROUND

1. Field

The disclosure relates generally to network security and more specifically to detecting abnormal application activity in a data processing system, retrieving network packets corresponding to the detected abnormal application activity for analysis to identify content in the network packets causing the abnormal application activity, and blocking network traffic containing the identified content to prevent the abnormal application activity.

2. Description of the Related Art

Currently, a number of solutions exist that are targeted to network security. These solutions either protect against known attacks or identify malicious behavior. These solutions may range from traditional anti-virus and firewall solutions to intrusion prevention and network forensic solutions. However, today's attackers are clever and patient, and often leave almost no evidence that the attackers were ever present. In addition, methods of attack are getting more and more sophisticated. As a result, existing network security solutions are not sufficient to protect against advanced persistent threats because these solutions are dedicated on connected network traffic and don't have deep knowledge regarding what is occurring in real-time. An advanced persistent threat uses multiple phases to hack into a network, avoid detection, and harvest information over an extended period of time. As a result, network security solutions need to be more intelligent to protect against such threats.

SUMMARY

According to one illustrative embodiment, a computer-implemented method for preventing abnormal application activity is provided. A data processing system retrieves packets from a packet buffer using packet location information corresponding to information associated with the abnormal application activity in the data processing system. The data processing system analyzes the packets to identify content of the network packets causing the abnormal application activity. The data processing system blocks network packets containing the content causing the abnormal application activity in the data processing system. According to other illustrative embodiments, a data processing system and computer program product for preventing abnormal application activity are provided.

DETAILED DESCRIPTION

Figure 1:
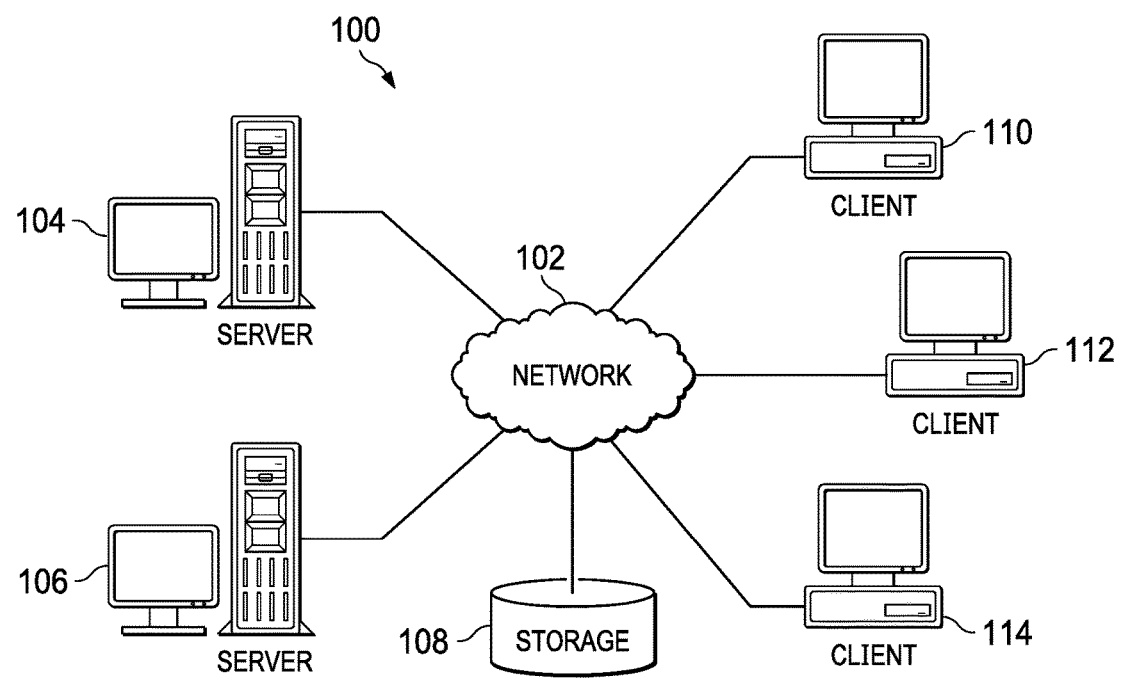
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
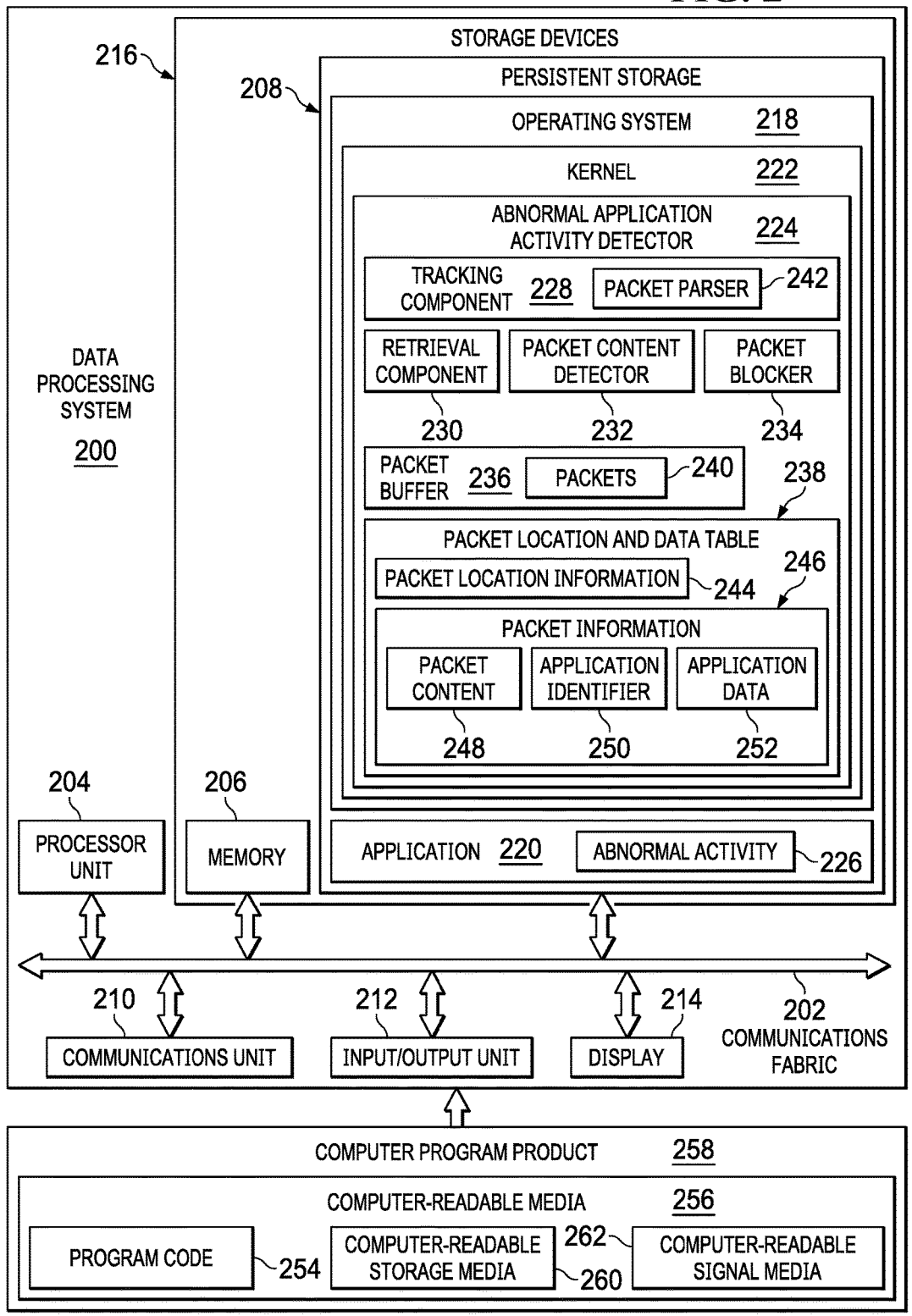
FIG. 2 is a diagram of a data processing system in which illustrative embodiments may be implemented.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services to client devices. For example, server 104 and server 106 may provide information, such as, for example, operating system images, software applications and programs, software patches, and the like, to clients 110, 112, and 114. Also, it should be noted that server 104 and server 106 may each represent a plurality of different servers providing a plurality of different services.

Client 110, client 112, and client 114 also connect to network 102. Clients 110, 112, and 114 are clients of server 104 and/or server 106. Users of clients 110, 112, and 114 may utilize clients 110, 112, and 114 to request services or information from server 104, server 106, or other data processing devices connected to network 102.

In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart watches, smart televisions, smart appliances, personal digital assistants, gaming devices, kiosks, and the like, with wire or wireless communication links to network 102.

Storage 108 is a network storage device capable of storing any type of data in a structured format or an unstructured format. In addition, storage 108 may represent a set of one or more network storage devices. Storage 108 may store, for example, identifiers for a plurality of different client devices; identifiers for a plurality of different applications corresponding to the plurality of different client devices; mappings between network packets and detected abnormal activity performed by different applications processing the network packets; identification of packet content causing the detected abnormal activities; and the like. Further, storage 108 may store other data, such as authentication or credential data that may include user names, passwords, and biometric data associated with users and system administrators, for example.

In addition, it should be noted that network data processing system 100 may include any number of additional server devices, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a data processing device, such as server 104 or client 110 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores operating system 218 and application 220. Operating system 218 is system software that manages hardware and software resources of data processing system 200 and provides common services for applications, such as application 220. Operating system 218 includes kernel 222. Kernel 222 is a core program of operating system 218. For example, kernel 222 handles input/output requests from software and translates these requests into data processing instructions for processor unit 204. In other words, kernel 222 connects the software to hardware of data processing system 200. Code of kernel 222 is loaded into a protected area of memory 206.

In this example, kernel 222 includes abnormal application activity detector 224. Abnormal application activity detector 224 detects abnormal activity, such as abnormal activity 226, in application 220. Abnormal activity 226 may be, for example, an access control violation by application 220, a memory access violation by application 220, occurrence of a network security event caused by application 220, crash of application 220, and the like. However, it should be noted that the foregoing list of abnormal activities is only meant as an example and not as a limitation on illustrative embodiments. Also, it should be noted that application 220 may represent any type of software application, such as a browser, running on data processing system 200 and also may represent a plurality of different applications.

Further, it should be noted that even though abnormal application activity detector 224 is illustrated as residing in kernel 222, in an alternative illustrative embodiment abnormal application activity detector 224 may be separate from kernel 222. For example, abnormal application activity detector 224 may be located in persistent storage 218 as a standalone component. In another alternative illustrative embodiment, abnormal application activity detector 224 may be a hardware component coupled to communication fabric 202 or a combination of hardware and software components.

In this example, abnormal application activity detector 224 includes tracking component 228, retrieval component 230, packet content detector 232, packet blocker 234, packet buffer 236, and packet location and data table 238. However, it should be noted that abnormal application activity detector 224 may include more or fewer components than illustrated. In other words, different illustrative embodiments may merge two or more components into one component, split one component into two or more components, and add other components not shown.

Abnormal application activity detector 224 utilizes tracking component 228 for real-time monitoring of incoming network packets received by data processing system 200, recording of information corresponding to each of the network packets, and identifying locations, such as buffer addresses, of the network packets, such as packets 240, stored in packet buffer 236 for later retrieval. Tracking component 228 maintains packet location and data table 238, which maps relationships between each packet in packets 240 and an application, such as application 220, which processes that packet. In other words, each entry in packet location and data table 238 is a mapping record of one network connection to one application. When data processing system 200 receives a network packet, tracking component 228 utilizes packet parser 242 to parse metadata of that particular network packet, identify information corresponding to that particular network packet, and record the information in an entry corresponding to that particular network packet in packet location and data table 238. In parallel (i.e., at a same time), tracking component 228 stores the newly received network packet in packet buffer 236, identifies the location of that particular network packet in packet buffer 236, and adds the location information of that particular network packet to the corresponding entry in packet location and data table 238 for the particular network packet.

For example, packet location and data table 238 includes packet location information 244 and packet information 246. Packet location information 244 and packet information 246 are both stored in each entry corresponding to respective network packets. Packet location information 244 represents location information, such as a buffer address, for each network packet received by data processing system 200 and stored in packet buffer 236. It should be noted that packet buffer 236 is a first-in, first-out (FIFO) circular buffer. Packet information 246 represents data corresponding to each network packet stored in packet buffer 236. In this example, packet information 246 includes packet content 248, application identifier 250, and application data 252.

Packet content 248 represents the particular data and information contained within a received network packet. Application identifier 250 represents a unique identifier that identifies the application, such as application 220, which is processing the received network packet. Application data 252 represents other information, such as, for example, application type, application version, application name, and the like, corresponding to the application processing the received network packet.

When abnormal application activity detector 224 detects abnormal activity 226, abnormal application activity detector 224 utilizes retrieval component 230 to retrieve all network packets currently stored in packet buffer 236 that correspond to abnormal activity 226. Retrieval component 230 utilizes packet information 246 corresponding to the network packets causing abnormal activity 226 to identify the respective locations of those network packets within packet buffer 236. Retrieval component 230 finds the respective buffer locations of those network packets within packet location information 244, which is stored in packet location and data table 238 with each corresponding packet information entry. Alternatively, retrieval component 230 may reconstruct the network packets based on data contained in packet information 246.

Retrieval component 230 places the retrieved or reconstructed network packets corresponding to abnormal activity 226 in a file for review by a user, such as an analyst or system administrator. This may assist the user in quickly identifying the root cause of abnormal activity 226. In addition, retrieval component 230 passes packet content 248 corresponding to the retrieved or reconstructed network packets to packet content detector 232. Abnormal application activity detector 224 utilizes packet content detector 232 to analyze packet content 248 corresponding to the network packets causing abnormal activity 226 to identify what exactly in those network packets is causing abnormal activity 226. Further, abnormal application activity detector 224 may generate related rules in real-time to prevent further attacks.

After packet content detector 232 identifies what packet content 248 is causing abnormal activity 226, packet content detector 232 passes that information to packet blocker 234, along with any generated related rules. Abnormal application activity detector 224 utilizes packet blocker 234 to block or prevent network packets containing identified packet content 248 causing abnormal activity 226 from being processed by application 220. For example, packet blocker 234 may prevent data processing system 200 from receiving those network packets by creating a firewall to block the network connection sending those packets.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (WiFi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by processor unit 204. Program code 254 and computer readable media 256 form computer program product 258. In one example, computer readable media 256 may be computer readable storage media 260 or computer readable signal media 262. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200. In some instances, computer readable storage media 260 may not be removable from data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 254 may be downloaded over a network to persistent storage 208 from another device or data processing system through computer readable signal media 262 for use within data processing system 200. For instance, program code stored in a computer readable storage media in a data processing system may be downloaded over a network from the data processing system to data processing system 200. The data processing system providing program code 254 may be a server computer, a client computer, or some other device capable of storing and transmitting program code 254.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 260 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Traditional network protection and security information and event management (SIEM) software need to filter a multitude of background network traffic to find relationships between a network connection and an application that processes packets flowing over the network connection. These traditional techniques provide analysis of security alerts generated by network hardware and applications. However, the footprint of an abnormal application activity seems to disappear when these traditional techniques try to find it.

Illustrative embodiments identify and map relationships between abnormal application activities and network traffic in real-time. When an operating system of a data processing device detects abnormal activities in one or more applications while processing network traffic, illustrative embodiments are able to quickly identify the root cause of the abnormal application activity (i.e., those network packets causing the abnormal application activity) and send this information to a system administrator for review or save this information in a system file. Moreover, illustrative embodiments are capable of further analyzing stored network traffic to determine possible data leaks or vulnerabilities and generate related rules to prevent future threats to the data processing device.

Illustrative embodiments take advantage of a circular buffer in a network stack of the operating system. In other words, illustrative embodiments store previously received network packets in the circular buffer of the operating system until newly received network packets overwrite them. However, it should be noted that alternative illustrative embodiments may locate the circular buffer in another component of the data processing device. For example, one alternative illustrative embodiment may locate the circular buffer in a network interface card.

In response to the operating system detecting that abnormal application activity exists in the data processing device, illustrative embodiments retrieve network packets corresponding to the abnormal application activity from the circular buffer, analyze content of these network packets, and export these network packets into one or more system files, such as packet capture files. System administrators may then use these system files to do further analysis, such as SIEM reports or network forensics.

Illustrative embodiments utilize a tracking component and a retrieving component. The tracking component generates and maintains a packet data table to map relationships between network connections sending network traffic and those applications processing the network traffic in real-time. Thus, each entry in the packet data table is a mapping between one network connection and one application identifier. When a network packet arrives, the tracking component first parses metadata of that packet and stores the parsed information in a corresponding entry of the packet data table.

Upon detection of an abnormal application activity, which is caused by one or more packets received from a particular network connection, illustrative embodiments trigger the retrieving component to locate and retrieve all packets from the circular buffer that are related to this abnormal application activity using the information stored in the packet data table. For each retrieved packet, illustrative embodiments utilize a packet content detector to analyze content corresponding to the retrieved packets and determine the root cause of the abnormal application activity.

It should be noted that illustrative embodiments may be applied to network protection appliances, end point protection systems, endpoint detection and response systems, and next generation intrusion prevention systems, for example. Also, it should be noted that illustrative embodiments do not require an extra physical device to capture, analyze, and store network packets. For example, illustrative embodiments may implement the tracking component and the retrieving component in software binaries. In addition, illustrative embodiments do not rely on a filter to determine whether each network packet matches a corresponding metric value. Instead, illustrative embodiments map the information corresponding to the network packets (e.g., application identifier, application type, network flow, et cetera) to the buffer address of the network packets. Once illustrative embodiments detect an abnormal application activity, such as an application crash, illustrative embodiments take action to retrieve as many network packets corresponding to the detected abnormal application activity from the circular buffer as possible using the packet information to buffer location mapping stored in the packet data table.

Figure 3:
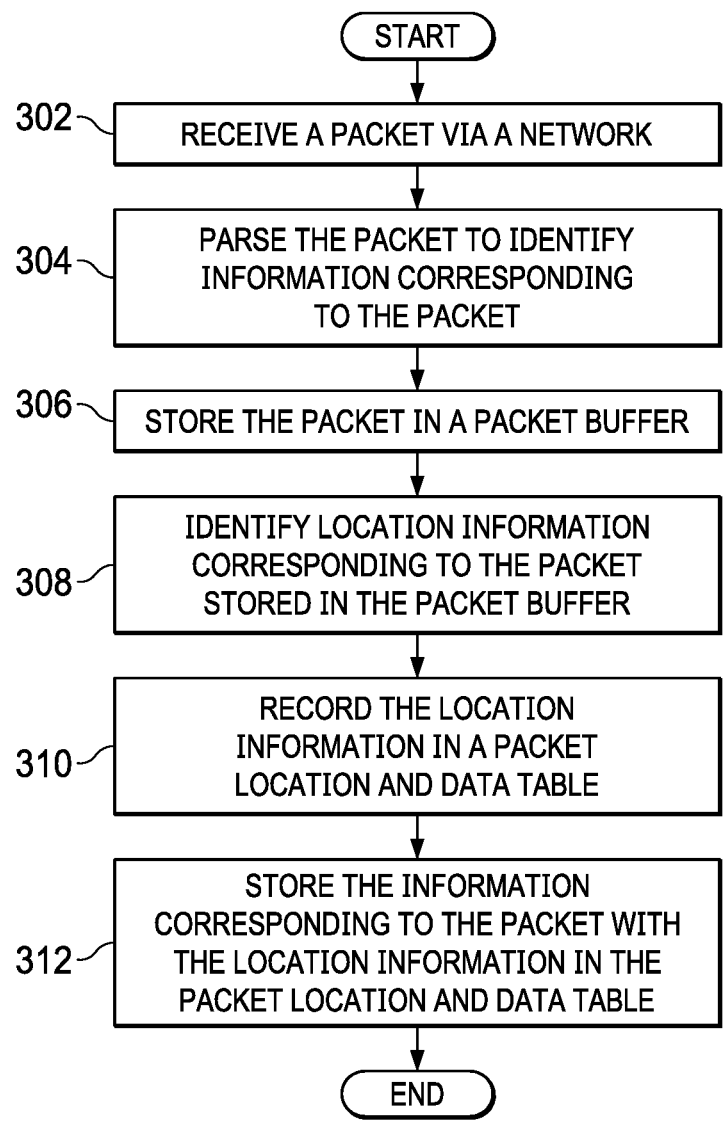
FIG. 3 is a flowchart illustrating a process for recording packet location and information in a table in accordance with an illustrative embodiment.

With reference now to FIG. 3, a flowchart illustrating a process for recording packet location and information in a table is shown in accordance with an illustrative embodiment. The process shown in FIG. 3 may be implemented in a data processing system, such as, for example, server 104 or client 110 in FIG. 1 or data processing system 200 in FIG. 2.

The process begins when the data processing system receive a packet via a network (step 302). The network may be, for example, network 102 in FIG. 1. The data processing system parses the packet to identify information corresponding to the packet (step 304). The data processing system may utilize, for example, a packet parser, such as packet parser 242 in FIG. 2, to parse the packet to identify the information. The information corresponding to the packet may be, for example, packet information 246 in FIG. 2. The packet information may include, for example, content of the packet, an identifier of the application that is to process the packet, and data corresponding to that particular application, such as type of application, version of the application, description of the application, and the like.

The data processing system stores the packet in a packet buffer of an operating system kernel (step 306). The packet buffer of the operating system kernel may be, for example, packet buffer 236 in kernel 222 of operating system 218 in FIG. 2. The data processing system also identifies location information corresponding to the packet stored in the packet buffer (step 308).

The data processing system records the location information corresponding to the packet stored in the packet buffer in a packet location and data table of the operating system kernel (step 310). The location information, which is recorded in the packet location and data table, corresponding to the packet stored in the packet buffer may be, for example, packet location information 244 recorded in packet location and data table 238 in FIG. 2. In addition, the data processing system stores the information corresponding to the packet with the location information recorded in the packet location and data table (step 312). Thereafter, the process terminates.

Figure 4:
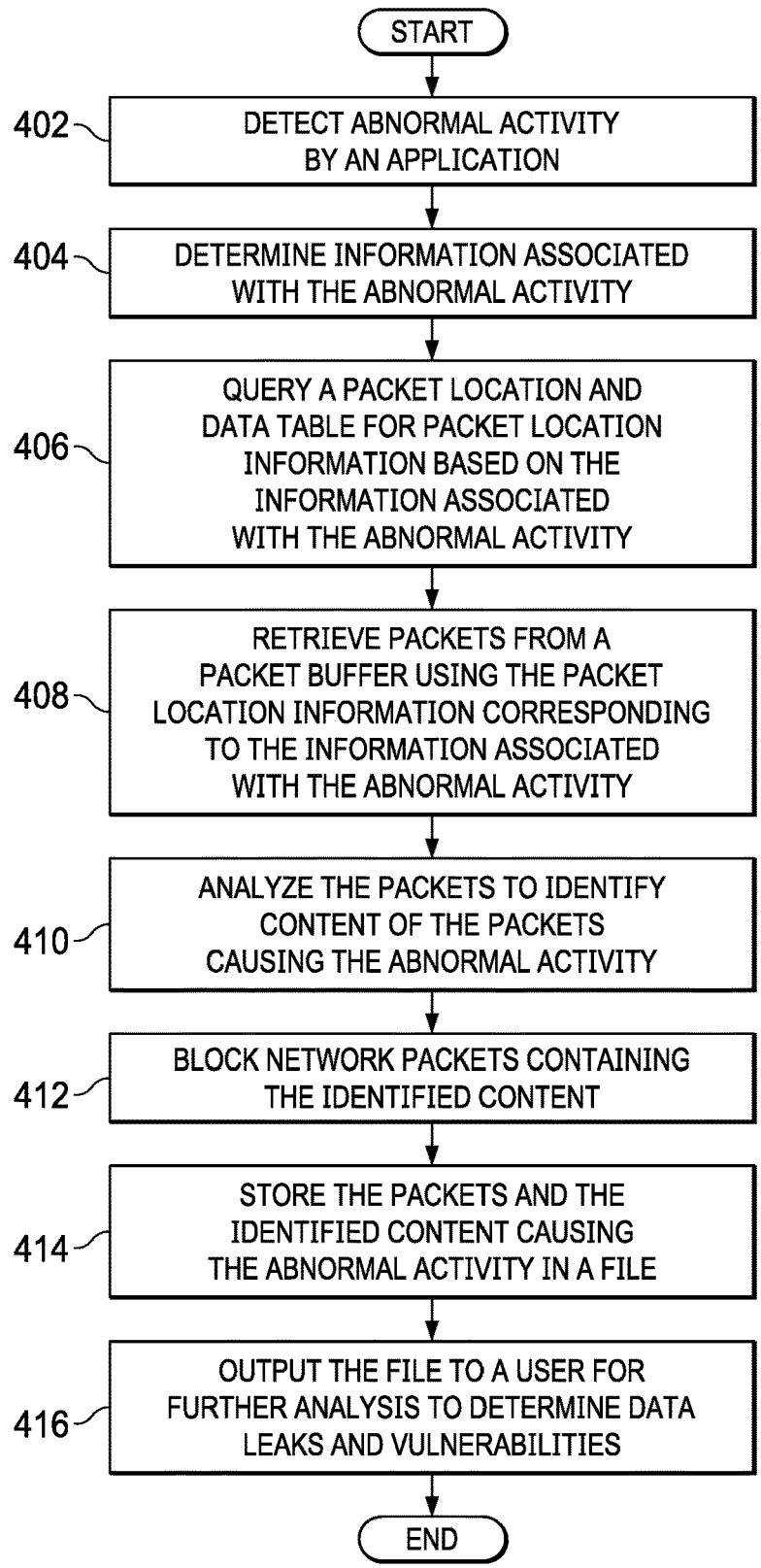
FIG. 4 is a flowchart illustrating a process for retrieving packets from a buffer using packet location and information recorded in a table in accordance with an illustrative embodiment.

With reference now to FIG. 4, a flowchart illustrating a process for retrieving packets from a buffer using packet location and information recorded in a table is shown in accordance with an illustrative embodiment. The process shown in FIG. 4 may be implemented in a data processing system, such as, for example, server 104 or client 110 in FIG. 1 or data processing system 200 in FIG. 2.

The process begins when the data processing system detects an abnormal activity by an application running on the data processing system (step 402). The data processing system may utilize, for example, an abnormal application activity detector, such as abnormal application activity detector 224 in FIG. 2, to detect the abnormal activity by the application. The abnormal activity by the application may be, for example, abnormal activity 226 in application 220 in FIG. 2, and may include an access control violation, a memory access violation, occurrence of a network security event, application crash, and the like.

In addition, the data processing system determines information associated with the abnormal activity (step 404). The information associated with the abnormal activity may include, for example, an identifier and other information associated with the application corresponding to the abnormal activity, such as application identifier 250 and application data 252 in FIG. 2. The other information associated with the application may include, for example, a description of the application, functionality of the application, data processed by the application, version of the application, and the like. Further, the data processing system queries a packet location and data table of an operating system kernel for packet location information based on the information associated with the abnormal activity (step 406). The packet location and data table of the operating system kernel may be, for example, packet location and data table 238 of kernel 222 in operating system 218 of FIG. 2. The packet location information may be, for example, packet location information 244 in FIG. 2.

Afterward, the data processing system retrieves packets from a packet buffer of the operating system kernel using the packet location information corresponding to the information associated with the abnormal activity (step 408). The packets in the packet buffer may be, for example, packets 240 in packet buffer 236 in FIG. 2. The data processing system may utilize, for example, a retrieval component, such as retrieval component 230 in FIG. 2 to retrieve the packets from the packet buffer. Furthermore, the data processing system analyzes the packets using a packet content detector of the data processing system to identify content of the packets causing the abnormal activity in the application (step 410). The packet content detector may be, for example, packet content detector 232 in FIG. 2. The content of the packets may be, for example, packet content 248 in FIG. 2.

Moreover, the data processing system blocks network packets containing the identified content causing the abnormal activity of the application (step 412). Thus, the data processing system, itself, is able to stop the abnormal activity and prevent future threats. The data processing system may utilize, for example, a packet blocker, such as packet blocker 234 in FIG. 2, to block the network packets containing the identified content. The data processing system also stores the packets retrieved from the packet buffer and the identified content causing the abnormal activity of the application in a file (step 414). In addition, the data processing system outputs the file to a user of the data processing system for further analysis to determine data leaks and vulnerabilities (step 416). Thereafter, the process terminates.

Thus, illustrative embodiments of the present invention provide a computer-implemented method, data processing system, and computer program product for detecting abnormal application activity in a data processing system, retrieving network packets corresponding to the detected abnormal application activity for analysis to identify content in the network packets causing the abnormal application activity, and blocking network traffic containing the identified content to prevent the abnormal application activity. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data processing system for preventing abnormal application activity, the data processing system comprising:
a bus system;
a storage device connected to the bus system, wherein the storage device stores program instructions; and
a processor connected to the bus system, wherein the processor executes the program instructions to:

retrieve packets from a packet buffer in response to detecting the abnormal application activity using packet location information corresponding to information associated with the detected abnormal application activity in the data processing system, wherein the packet location information is used to map a relationship between a received packet and a specific application, executing on the data processing system, that is associated with the detected abnormal activity causing security violation;

analyze the packets to identify content of the packets causing the abnormal application activity; and block network packets containing the content causing the abnormal application activity in the data processing system.

2. The data processing system of claim 1, wherein the processor further executes the program instructions to:

detect the abnormal application activity in the data processing system;

determine the information associated with the abnormal application activity; and query a packet location and data table for the packet location information based on the information associated with the abnormal application activity.

3. The data processing system of claim 2, further comprising:

use the packet location and data table to map a relationship between the packets and an application executing on the data processing system that processes the packets.

4. The data processing system of claim 2, wherein the packet location and data table includes packet location information and packet information, wherein the packet location information represents location information for each network packet received by the data processing system and the packet information includes packet content and an application identifier for an application executing on the data processing system that processes the each network packet received by the data processing system.

5. The data processing system of claim 1, wherein the processor further executes the program instructions to:

store the packets retrieved from the packet buffer and the content causing the abnormal application activity in a file; and output the file including the packets retrieved from the packet buffer and the content causing the abnormal application activity to a user of the data processing system for further analysis to determine data leaks and vulnerabilities.

6. The data processing system of claim 1 further comprising:

receive a packet via a network; and parse the packet to identify information corresponding to the packet.

7. The data processing system of claim 6 further comprising:

store the packet in the packet buffer; and identify location information corresponding to the packet stored in the packet buffer.

8. The data processing system of claim 1 further comprising:

record the location information corresponding to the packet stored in the packet buffer in a packet location and data table; and store the information corresponding to the packet with the location information recorded in the packet location and data table.

9. The data processing system of claim 1, wherein the abnormal application activity is abnormal activity of an application executing on the data processing system.

10. The data processing system of claim 9, wherein the abnormal application activity comprises at least one of an access control violation by the application, a memory access violation by the application, an occurrence of a network security event caused by the application, and a crash of the application.

11. A computer program product for preventing abnormal application activity, the computer program product comprising a non-transitory computer readable storage medium having program instructions embodied therewith, the program instructions executable by a data processing system to cause the data processing system to perform a method comprising:

retrieving, by the data processing system, packets in response to detecting the abnormal application activity from a packet buffer using packet location information corresponding to information associated with the detected abnormal application activity in the data processing system, wherein the packet location information is used to map a relationship between a received packet and a specific application, executing on the data processing system, that is associated with the detected abnormal activity causing security violation;

analyzing, the data processing system, the packets to identify content of the packets causing the abnormal application activity; and blocking, by the data processing system, network packets containing the content causing the abnormal application activity in the data processing system.

12. The computer program product of claim 11 further comprising:

detecting, by the data processing system, the abnormal application activity in the data processing system;

determining, by the data processing system, the information associated with the abnormal application activity; and querying, the data processing system, a packet location and data table for the packet location information based on the information associated with the abnormal application activity.

13. The data processing system of claim 12, further comprising:

using the packet location and data table to map a relationship between the packets and an application executing on the data processing system that processes the packets.

14. The data processing system of claim 12, wherein the packet location and data table includes packet location information and packet information, wherein the packet location information represents location information for each network packet received by the data processing system and the packet information includes packet content and an application identifier for an application executing on the data processing system that processes the each network packet received by the data processing system.

15. The computer program product of claim 11 further comprising:

storing, by the data processing system, the packets retrieved from the packet buffer and the content causing the abnormal application activity in a file; and outputting, by the data processing system, the file including the packets retrieved from the packet buffer and the content causing the abnormal application activity to a user of the data processing system for further analysis to determine data leaks and vulnerabilities.

16. The computer program product of claim 11 further comprising:

receiving, by the data processing system, a packet via a network; and parsing, by the data processing system, the packet to identify information corresponding to the packet.

17. The computer program product of claim 16 further comprising:

storing, by the data processing system, the packet in the packet buffer; and identifying, by the data processing system, location information corresponding to the packet stored in the packet buffer.

18. The computer program product of claim 17 further comprising:

recording, by the data processing system, the location information corresponding to the packet stored in the packet buffer in a packet location and data table; and storing, by the data processing system, the information corresponding to the packet with the location information recorded in the packet location and data table.

19. The data processing system of claim 11, wherein the abnormal application activity is abnormal activity of an application executing on the data processing system.

20. The data processing system of claim 19, wherein the abnormal application activity comprises at least one of an access control violation by the application, a memory access violation by the application, an occurrence of a network security event caused by the application, and a crash of the application.

* * * * *